(12) United States Patent
Matsunaga et al.

(10) Patent No.: US 7,736,708 B2
(45) Date of Patent: Jun. 15, 2010

(54) MICROPATTERN RETARDATION ELEMENT (75) Inventors: Daisaku Matsunaga, Minato-ku (JP);
Masanori Hashimoto, Koshigaya (JP);
Christian Ruslim, Tsukuba (JP);
Takashi Tamaki, Tsukuba (JP);
Kunihiro Ichimura, Yokohama (JP)

(73) Assignees: National Institute Of Advanced Industrial Science and Technology, Tokyo (JP); Nippon Kayaku Kabushiki Kaisha, Tokyo (JP)

( * ) Notice: Subject to any disclaimer, the term of this patent is extended or adjusted under 35 U.S.C. 154(b) by 681 days.

(21) Appl. No.: 10/593,884

(22) PCT Filed: Mar. 29, 2005

(86) PCT No.: PCT/JP2005/005848

§ 371 (c)(1),
(2), (4) Date: Sep. 21, 2006

(87) PCT Pub. No.: WO2005/096041

PCT Pub. Date: Oct. 13, 2005

(65) Prior Publication Data

US 2007/0134442 A1      Jun. 14, 2007

(30) Foreign Application Priority Data

Mar. 30, 2004   (JP) .............................. 2004-099122

(51) Int. Cl.
*G02F 1/1337*  (2006.01)
*G02F 1/13363* (2006.01)

(52) U.S. Cl. .................. 428/1.3; 428/1.2; 349/124

(58) Field of Classification Search ........... 428/1.2–1.3; 349/123–124
See application file for complete search history.

(56) References Cited

U.S. PATENT DOCUMENTS

| | | | | |
|---|---|---|---|---|
| 5,024,850 A | * | 6/1991 | Broer et al. | ................ 428/1.31 |
| 5,246,748 A | * | 9/1993 | Gillberg-Laforce et al. | .. 428/1.2 |
| 5,327,285 A | | 7/1994 | Faris | .......................... 359/483 |

(Continued)

FOREIGN PATENT DOCUMENTS

JP         62-96905        5/1987

(Continued)

OTHER PUBLICATIONS

Non-Patent Document 1: Sadeg M. Faris SID 91 Digest, p. 840 to 843.

*Primary Examiner*—Sophie Hon
(74) *Attorney, Agent, or Firm*—Nields, Lemack & Frame, LLC (57) ABSTRACT

The present invention relates to a micropattern retardation element requiring no stretch processing and no extremely high positioning accuracy in cutting films, and the like, and having the retardation region controlled in width of a micron unit, and a producing method therefore. Said micropattern retardation element can be obtained by forming a liquid crystalline or non liquid crystalline polymer thin film layer having photoactive groups, on a substrate, and then, after orientation treatment in a micropattern form, forming a birefringence layer so as to contact with said polymer thin film layer, so that birefringence molecules of said birefringence layer are oriented according to orientation of photoactive groups in said thin film. Said retardation element is used in a three-dimensional display, and the like.

2 Claims, 2 Drawing Sheets

U.S. PATENT DOCUMENTS

| | | | |
|---|---|---|---|
| 5,583,679 A * | 12/1996 | Ito et al. | 349/118 |
| 5,751,389 A * | 5/1998 | Andreatta et al. | 349/97 |
| 5,861,931 A * | 1/1999 | Gillian et al. | 349/129 |
| 6,001,277 A * | 12/1999 | Ichimura et al. | 252/299.4 |
| 6,153,272 A * | 11/2000 | Kim et al. | 428/1.5 |
| 6,156,232 A * | 12/2000 | Shashidhar et al. | 252/299.4 |
| 6,541,185 B1 * | 4/2003 | Matsunaga et al. | 430/321 |
| 6,582,776 B2 * | 6/2003 | Yip et al. | 427/514 |
| 6,686,980 B1 * | 2/2004 | Ichihashi | 349/96 |
| 6,808,766 B1 * | 10/2004 | Miyama et al. | 428/1.25 |
| 6,822,713 B1 * | 11/2004 | Yaroshchuk et al. | 349/117 |
| 6,831,148 B2 * | 12/2004 | Buchecker et al. | 528/310 |
| 6,875,483 B2 * | 4/2005 | Ichihashi et al. | 428/1.23 |
| 2002/0061996 A1 * | 5/2002 | Buchecker et al. | 526/307.1 |
| 2002/0063958 A1 | 5/2002 | Maeda et al. | 359/465 |
| 2003/0072896 A1 * | 4/2003 | Kwok et al. | 428/1.23 |
| 2003/0096065 A1 * | 5/2003 | Berneth et al. | 428/1.1 |
| 2003/0143343 A1 * | 7/2003 | Kawabata et al. | 428/1.1 |
| 2003/0197821 A1 * | 10/2003 | Mi | 349/117 |
| 2004/0008304 A1 * | 1/2004 | Nair et al. | 349/117 |
| 2004/0138394 A1 * | 7/2004 | Buchecker et al. | 526/303.1 |
| 2004/0185215 A1 * | 9/2004 | Marck et al. | 428/64.4 |
| 2005/0266177 A1 * | 12/2005 | Sawatari et al. | 428/1.2 |

FOREIGN PATENT DOCUMENTS

| | | |
|---|---|---|
| JP | 9-138308 | 5/1997 |
| JP | 2001-11174 | 1/2001 |
| JP | 2001-59948 | 3/2001 |
| JP | 2001-59949 | 3/2001 |
| JP | 2001-159713 | 6/2001 |
| JP | 2002-14301 | 1/2002 |
| JP | 2002-357720 | 12/2002 |

* cited by examiner

MICROPATTERN RETARDATION ELEMENT

This application is a 371 of PCT/JP05/05848, filed Mar. 29, 2005.

TECHNICAL FIELD

The present invention relates to a novel micropattern retardation element and a method for producing the same, and further a liquid crystal display element enabling three-dimensional view by using the micropattern retardation element.

BACKGROUND ART

Various methods have been proposed in relation to technology of three-dimensionally view image (three-dimensional view). One of such technology, two-lens type three-dimensional view using polarized light, is one also called as a polarized light glasses system. This is an observation system, wherein image obtained from a right eye and a left eye in wearing state of glasses each using a polarizing plate having an orthogonal polarizing axis on each eye, is one having binocular parallax, and image information at right and left sides is each assigned to right and left eyes by a polarizing plate of observer's glasses, by means of orthogonalizing each polarized light plane of light. To view image with different polarized light direction in this system, a method for synthesizing image, created by using two displays or projectors, by means of a half mirror or a polarized light mirror, is adopted. This system had a problem that a display is costly and not suitably used in showing three-dimensional view for domestic application or in an office and other occasions for small members, although it is suitable as a display to many audiences. Therefore, use of a micropattern polarizing element having each polarized light axis in orthogonal position in the same plane as a display has been proposed, which has features to enable simultaneous display of images for a right eye and a left eye in one display, and display cost can be made lower.

Conventionally, several polarizing elements formed with a pattern in a plurality of polarizing light region having a different direction of a polarizing light transmittance axis have been known.

For example, in Patent Document 1, a method for application of a resist on a stretched polyvinyl alcohol film, then pattern exposing and developing, patterning the resist and dying a portion of the stretched polyvinyl alcohol film not-covered with the resist with a dichroic compound to form a polarized light region with desired pattern has been proposed. Sadeg M. Faris presented a method for applying a resist on a stretched dichroic polyvinyl alcohol film, patterning, and then removing by dissolving in an aqueous solution of sodium hydroxide to obtain a patterned polarizing film, and producing a polarizing element called μPol by laminating 2 patterned polarizing films each having an orthogonal polarizing axis, and a method for using thereof in three-dimensional viewing, at Society of Information and Display Conference in 1991 (Non-Patent Document 1). Also in Patent Document 2, Patent Document 3 and Patent Document 4, a system for irradiation of polarized light in a pattern form on a thin film consisting of a photo-orientation substance coated on a substrate, on which a solution of a dichroic colorant is applied and oriented to prepare a micropattern polarizing element with orthogonal light axis, and thus completing a retardation element in response to an LCD pixel electrode, has been proposed.

On the other hand, in Patent Documents 5, 6, 7 and 8, a retardation film having a micropattern used for a three-dimensional display has been disclosed.

In Patent Documents 5 and 6, a film having a portion with retardation function and a portion with retardation function lost, in a micropattern form has been proposed, which is obtained by forming a retardation film on a transparent supporting substance via adhesives, and subsequently by forming a resist part on a specified position of said retardation film, followed by immersing in hot water, allowing retardation function to disappear at a portion of a retardation film without presence of a resist part, and drying.

In addition, in Patent Document 7 and Patent Document 8, a film having a portion with retardation function and a portion with retardation function lost, in a micropattern form has been proposed, which is obtained by forming a retardation film on a transparent supporting substance and cutting away a specific portion of a retardation film by an ultra hard blade.

Patent Document 1: JP-A-62-96905

Patent Document 2: JP-A-2001-159713

Patent Document 3: JP-A-2002-357720

Patent Document 4: U.S. Pat. No. 5,327,285

Patent Document 5: JP-A-2001-59948

Patent Document 6: JP-A-2001-59949

Patent Document 7: JP-A-2002-14301

Patent Document 8: JP-A-2001-147499

Non-Patent Document 1: Sadeg M. Faris SID 91 DIGEST, page 840 to 843

PROBLEMS TO BE SOLVED BY THE INVENTION

Polarizing elements or retardation films formed with a pattern in plural polarizing light regions with a different direction of a polarizing light transmission axis, used for conventionally well-known three-dimensional display have the following problems.

Namely, as for a polarizing element, in a method presented by Sadeg M. Faris at Society of Information and Display Conference (Non-Patent Document 1, Patent Document 4), a resist is coated on a stretched birefringence polyvinyl alcohol film, and after patterning, it was removed by dissolving with an aqueous solution of sodium hydroxide, and in this step, a polarizing element parts left swells, which poses a problem that polarization ability is lowered, and in addition, extremely high positioning accuracy in posting is required due to producing by posting two kinds of substrates having an orthogonal polarizing axis.

In methods disclosed in Patent Document 2, Patent Document 3 and Patent Document 4, polarized light is irradiated in a pattern form on a thin film of a photo-orientation substance coated on a substrate, on which a solution of a dichroic colorant is applied and oriented to produce a micropattern polarizing element with an orthogonal light axis, which poses a problem of requiring a plurality of dichroic colorants each having a different absorption band to cover whole visible light zone, although having advantage of dramatic reduction, such as a step of posting polarizing elements.

In addition, as for a retardation film having a pattern used in a three-dimensional display, in a method disclosed in Patent Document 5, a retardation film is formed on a transparent supporting substance via adhesives, and subsequently a resist part is formed at a specified position of said retardation film, followed by immersing in hot water, wherein water infiltrates into a portion with non-resist material of a retardation film, and denatures said portion and allows to disappear property to rotate a vibration direction of light in specific wavelength region while maintaining in linear polarized light state (retardation function) only at said portion, which results in a film with a transmission light phase altered by 180 degrees between a portion with a resist part and a portion with non-resist part, however, because immersing in hot water induces appearance of partial swelling, dissolution and rugged interface at the immersed portion, and the like, there is a light diffusion problem causing lowering of resolution and contrast.

In a method disclosed in Patent Document 6, a retardation film is formed on a transparent supporting substance via adhesives, and subsequently a resist part is formed at a specified position of said retardation film, followed by immersing in hot water, allowing retardation function to disappear at a portion with non-resist part of a retardation film, and then after drying, a protective part is formed at resist part side, by which hygrothermal resistance is improved, however, there is a problem of unclear boundary between a portion with retardation function lost and a portion with retardation function not lost, caused by hot water treatment.

In a method disclosed in Patent Document 7 and Patent Document 8, a film with a transmission light phase altered by 180 degrees between a concaved groove portion and other portion, is obtained by forming a retardation film on a transparent supporting substance and cutting away a specified portion of a retardation film by an ultra hard blade, and because removed portion of a concaved groove has no retardation film and naturally does not fulfill property to rotate a vibration direction of light of specific wavelength region which a retardation has while maintaining linear polarized light state, however, there is a problem that extremely high accuracy is required in a partially cutting step of a retardation film oriented on a supporting substance (substrate), in a concaved groove form, by an ultra hard blade (such as a saw blade).

DISCLOSURE OF THE INVENTION

The present inventors have considered to fundamentally solve the above problems of a retardation film having a micropattern, which can be used in a three-dimensional display. Namely, a problem to be solved by the present invention is to obtain a novel retardation element having a birefringence layer, formed with a micropattern superior in partial orientation, without requiring the above troublesome steps of hot water treatment or removal by cutting requiring ultra high accuracy, and a method for producing the retardation element, and further a liquid crystal display using the micropattern retardation element. In particular, it is an object of the present invention to provide such a retardation film or a retardation element which can control retardation region in micron unit, which was not known up to now.

MEANS FOR SOLVING PROBLEM

The present inventors have intensively studied a way to solve the above problems and completed the present invention.

Namely, the present inventors have studied a micropattern retardation element in a practical application level as a display element having totally enhanced orientation of a birefringence layer.

Because a retardation film has conventionally been produced by stretching a film, there has not been found a suitable method other than the above ones for producing a retardation film having a micropattern.

Therefore, the present inventors thought of and studied a way to produce a retardation element by means of orientation of liquid crystal and not depending on stretching, and making a micropattern of orientation of liquid crystal by means of controlling orientation of said liquid crystal by an oriented polymer film.

Specifically, at first, a photoactive molecular layer suitable to anisotropic orientation of a birefringence layer in a micropattern form was intensively studied. As a result, it has been found that, for a photoactive molecular layer, liquid crystalline polycondensation type polymers such as polyamide, polyimide and polyester, or liquid crystalline polyaddition type polymers such as polyurethane, or a liquid crystalline polyvinyl cinnamate, all bonded with photoactive groups, or non liquid crystalline polymethacryloyl(acryloyl) oxymethoxycarbonyloxyethylazobenzene having photoactive groups have superior adequacy to make a micropattern.

Then, the present inventors have studied on a birefringence layer. Namely, it was considered possible to sufficiently control molecular orientation of a birefringence layer to be formed on a polymer thin film of the above-described photoactive molecular layer, by furnishing high degree of orientation to the polymer thin film. In other words, it was considered possible, by the effect of a polymer thin film having high degree of orientation, to sufficiently control molecular orientation of a birefringence layer containing birefringence molecules, for example, liquid crystalline substances formed thereon, and, after the study, it was found out that in the case of highly oriented polymer thin film, nematic liquid crystal having thermotropic liquid crystalline property, and a substance with lyotropic liquid crystalline property, suitable as a retardation element could be oriented sufficiently enough to be suitable as a micropatterned retardation element.

Namely, it was found out that by formation of a liquid crystalline or non liquid crystalline polymer thin film layer having photoactive groups, on a substrate, and by irradiation of said polymer thin film with linear polarized light, a molecular axis of a birefringence layer can be oriented in an orientation direction of a molecular axis of photoactive groups, namely, in a direction specified by a polarizing axis of linear polarized light irradiated on said thin film, and that a polarizing axis is fixed to form a micropattern by a birefringence layer, and a micropattern retardation element can be obtained.

It was found out that by using a substrate consisting of the resultant retardation element and by using a micropattern retardation element having each polarized light axis in orthogonal position in the same plane, as a display, simultaneous display of images for a right eye and a left eye in one display is possible, and also an inexpensive display for three-dimensional view can be obtained.

That is, according to the present invention, the following inventions are provided:

(1) A retardation element characterized in that a liquid crystalline or non liquid crystalline polymer thin film layer having photoactive groups, subjected to photo orientation treatment is formed on a substrate, and a birefringence layer oriented in a micropattern form is formed so as to contact with said polymer thin film layer.

(2) The retardation element according to (1), wherein the photoactive group is at least one group selected from a group consisting of non-aromatic N=N, non-aromatic C=C and non-aromatic C=N.

(3) The retardation element according to (1) or (2), wherein the liquid crystalline polymer thin film layer is a thin film layer consisting of a polyamide resin, a polyimide resin, a polyester resin, a polyurethane resin, or a polyvinyl cinnamate resin.

(4) The retardation element according to (1) or (2), wherein the non liquid crystalline polymer thin film layer is a thin film layer consisting of polymethacryloyl(acryloyl)oxymethoxycarbonyloxyethylazobenzene.

(5) The retardation element according to any one of (1) to (4), characterized in that the birefringence layer oriented in a micropattern form is a birefringence layer oriented with birefringence molecules in a micropattern form.

(6) The retardation element according to (5), wherein the birefringence molecule is nematic liquid crystal having thermotropic liquid crystalline property.

(7) The retardation element according to (5), wherein the birefringence layer is a lyotropic liquid crystalline substance.

(8) A method for producing a retardation element, characterized by forming a liquid crystalline or non liquid crystalline polymer thin film layer having photoactive groups on a substrate, and then, after irradiation of linear polarized light to said polymer thin film layer, forming a birefringence layer oriented in a micropattern form on said polymer thin film layer.

(9) The method for producing a retardation element according to (8), characterized in that the photoactive group is at least one group selected from a group consisting of non-aromatic N=N, non-aromatic C=C and non-aromatic C=N.

(10) The method for producing a retardation element according to (8) or (9), wherein the liquid crystalline or polymer thin film layer is a thin film layer consisting of a polyamide resin, a polyimide resin, a polyester resin, a polyurethane resin, or a polyvinyl cinnamate resin.

(11) The method for producing a retardation element according to any one of (8) to (10), characterized in that the non liquid crystalline polymer thin film layer is a thin film layer consisting of polymethacryloyl(acryloyl)oxymethoxycarbonyloxyethylazobenzene.

(12) The method for producing a retardation element according to any one of (8) to (11), characterized in that formation of the birefringence layer orientated in a micropattern form is formation of birefringence molecules orientated in a micropattern form.

(13) The method for producing a retardation element according to (12), characterized in that the birefringence molecule is nematic liquid crystal having thermotropic liquid crystalline property.

(14) The method for producing a retardation element according to (12), wherein the birefringence layer is a lyotropic liquid crystalline substance.

(15) The method for producing a retardation element according to any one of (8) to (14), characterized in that linear polarized light is obtained for said polymer thin film layer through a mask with a micropattern form.

(16) A method for producing a retardation element, characterized by forming a liquid crystalline or non liquid crystalline polymer thin film layer having photoactive groups on a substrate, irradiating linear polarized light to said polymer thin film layer, through a mask with a micropattern form, then by irradiating linear polarized light having a different polarizing axis through a mask with a different micropattern form, and thereby forming a birefringence layer consisting of birefringence molecules, on said polymer thin film layer and orienting said birefringence molecules in a micropattern form.

(17) A method for producing a retardation element according to (16), wherein the photoactive group is at least one group selected from a group consisting of non-aromatic N=N, non-aromatic C=C and non-aromatic C=N.

(18) The method for producing a retardation element according to (15) or (16), wherein the liquid crystalline polymer thin film layer is a thin film layer consisting of a polyamide resin, a polyimide resin, a polyester resin, a polyurethane resin, or a polyvinyl cinnamate resin.

(19) The method for producing a retardation element according to (15) or (16), wherein the non liquid crystalline polymer thin film layer is a thin film layer consisting of polymethacryloyl(acryloyl)oxymethoxycarbonyloxyethylazobenzene.

(20) The method for producing a retardation element according to (16), characterized in that irradiation of the linear polarized light is carried out by irradiation of laser light having polarized light property.

(21) A three-dimensional display, which is a liquid crystal display, wherein at least one of opposing upper and lower substrates is a substrate having a retardation element according to any one of (1) to (7).

EFFECT OF THE INVENTION

According to the present invention, a micropattern retardation element can be obtained only by forming a birefringence layer containing birefringence molecules on a liquid crystalline or non liquid crystalline polymer thin film layer having photoactive groups, irradiated by linear polarized light, and by orienting the molecules in a micropattern form. Direct completion of a retardation element became possible also on an unstretchable substrate such as a glass substrate, because of no requirement of stretching operation. In addition, it became possible to arbitrarily alter molecular orientation of a birefringence layer only by changing a polarizing axis of linear polarized light to be irradiated on a polymer thin film, and therefore made it possible to produce a micropattern retardation element with a different polarizing axis, on a substrate. By using a liquid crystal display element applying this substrate, display of three-dimensional view becomes easily possible.

A liquid crystal display using a retardation element of the present invention, which makes it possible to partially control in-plane orientation of nematic liquid crystal, makes it possible to control in-plane orientation of liquid crystal in micrometer extremely small region in an arbitrary direction, and therefore, application to high quality LCD such as low power consumption drive, high definition display, display of highly realistic presence feeling, and the like is possible, and practical application is prospective to such as potable display medium essentially requiring low power consumption drive, high quality TV with high contrast and high definition, three-dimensional liquid crystal TV providing realistic presence feeling, and the like.

BEST EMBODIMENT FOR CARRYING OUT THE PRESENT INVENTION

The present invention is explained in detail below.

A liquid crystalline polymer compound having photoactive groups used in the present invention represents a liquid crystalline polymer inducing variation of molecular axis orientation of photoactive groups, by irradiation of linear polarized light. Variation of molecular axis orientation here represents phenomenon of variation of the molecular axis direction unidirectionally responsive to the linear polarized light, after absorption of photo energy of linear polarized light.

Any group having property to induce variation of the molecular axis direction by such irradiation of linear polarized light is included in a photoactive group in the present invention. As such a photoactive group, a double bond group exemplified by, for example, N=N, C=C, and C=N, and that the double bond group which is a non-aromatic group is included.

As an example of a group having a non-aromatic N=N bond, an aromatic azo group such as an azobenzene group, an azonaphthalene group, a bisazo group, a formazan group, and the like; and further an azoxybenzene group, and the like are included. As preferable examples of these groups, the following groups represented by the following formula are included:

—N=N-A-X, —OCO(CH$_2$)$_p$O-$p$.phe-N=N—B—Y,
and -A-N=N-$p$.phe-Y (wherein A and B represent a benzene ring or a naphthalene ring, which may have a substituent; X represents an alkoxy group having carbon atoms of 1 to 10, or a dialkyl amino group (carbon atoms of an alkyl group is 1 to 3), and alkyl groups in a dialkyl amino group may be the same or different each other, or may be non-substituted or either or both may be substituted with a cyano group or a hydroxy group; Y represents an atom or a group selected from a hydrogen atom, a fluorine atom, a chlorine atom, a nitro group, a cyano group, an alkyl group having carbon atoms of 1 to 10, an alkoxy group having carbon atoms of 1 to 10, an alkyloxycarbonylvinyl group (carbon atoms of an alkyl group is 1 to 4), a dialkylamino group (carbon atoms of an alkyl group is 1 to 3), a dihydroxyethylamino group, a hydroxyalkylamino group (carbon atoms of an alkyl group is 1 to 3), and a dicyanoethylamino group or a cyanoethylalkylamino group (carbon atoms of an alkyl group is 1 to 3). A subscript "p" represents an integer of 1 to 10; "phe" represents a benzene ring; and "p.phe" or "o.phe" represents that two substituents are in p-position or opposition, respectively.

As an example of a group having a non-aromatic C=C double bond, polyene, stilbene, stilbazole, stilbazolium, cinnamic acid, indigo, thioindigo, hemithioindigo, and the like are included. As a preferable example of these groups, groups represented by the following formula are included:

(wherein one of $X_1$ and $X_2$ represents a hydrogen atom, and the other represents an aromatic group which may have a substituent, or an alkoxycarbonyl group (carbon atoms of an alkyl group is 1 to 3), or $X_1$ and $X_2$ bond each other and represent a group represented by —S-o.phe-CO— and "o.phe" which may have a substituent; a substituent on an aromatic group or a "phe" group includes one represented by the above Y.)

As an example of a group having a non-aromatic C=N bond, an aromatic Schiff('s) base, an aromatic hydrazone group, and the like are included. As a preferable example of these groups, groups represented by the following formulae are include:

—NH—N=C($X_3$)($X_4$), —N=CH—B—Y,
and -A-CH=N-$p$.phe-Y (wherein one of $X_3$ and $X_4$ represents a hydrogen atom or an alkoxycarbonyl group (carbon atoms of an alkoxy group is 1 to 4), and the other represents a group represented by —B—Y— or an alkoxycarbonyl group (carbon atoms of an alkoxy group is 1 to 4), or $X_3$ and $X_4$ bond each other and represent a group represented by —CH=N—N(alkyl)-CO— (carbon atoms of an alkyl group is 1 to 4); and A, B, Y and "p.phe" mean the same as the above.)

Wavelength of light which a liquid crystalline polymer compound having these photoactive groups absorbs includes not only one of visible light region but also one of UV ray or infrared ray region. By irradiation of linear polarized light containing wavelength region which said compounds absorb on thin films of a liquid crystalline polymer compound having these photoactive groups, change in molecular axis orientation can easily be induced.

As a liquid crystalline polymer having photoactive groups, used in the present invention, for example, liquid crystalline polycondensation type polymers such as polyamide, polyimide and polyester, or liquid crystalline polyaddition type polymers such as polyurethane and liquid crystalline a polyvinyl cinnamate resin, all bonded with photoactive groups, can be included. Said liquid crystalline polymers may be any of homopolymers obtained by a reaction of a monomer having photoactive groups, or copolymers obtained by a reaction of a monomer having photoactive groups and a monomer not having photoactive groups, preferably the same kind of monomers. In the case of said copolymers, polymers obtained by copolymerization of a monomer not having photoactive groups, preferably the same kind of monomers, in a ratio of within 100 moles based on 1 mole of a monomer having photoactive groups are preferable, and polymers obtained by copolymerization of the same kind of monomers not having photoactive groups in a ratio of within 50 moles, based on 1 mole of a monomer having photoactive groups are more preferable. Polymers having such photoactive groups are well-known in the above Patent Document 2, and the like, and therefore can easily be synthesized by a method according to the method thereof, and the like.

As specific examples of said crystalline polymers, homopolymers having partial structure represented by the following chemical formulae (1) to (4), and substantially composed of this partial structure as a whole polymer, or homopolymers of liquid crystalline polyvinyl cinnamate, or copolymers containing said partial structure or partial structure corresponding to vinyl cinnamate, in a molar ratio of about 1 mol % or more, and more preferably 2 mol % or more, are included.

A polyamide compound having partial structure represented by the following chemical formula (1):

(Chemical Formula 1)

(1)

(wherein R represents a methyl group, an ethyl group, an iso-propyl group, or a chlorine atom; n represents an integer of 5 to 10;

z represents any of groups represented by the following formulae (a) to (e):

—N=N-A-X  (a)

—CH=C(X$_1$)(X$_2$)  (b)

—NH—N=C(X$_3$)(X$_4$)  (c)

—N=CH—B—Y  (d)

—OCO(CH$_2$)$_p$O-p.phe-N=N—B—Y  (e)

(wherein A represents a benzene ring or a naphthalene ring, which may have a substituent; X represents an alkoxy group having carbon atoms of 1 to 10, or a dialkyl amino group (carbon atoms of an alkyl group is 1 to 3), and alkyl groups in a dialkyl amino group may be the same or different each other, or may be non-substituted, or either or both may be substituted with a cyano group or a hydroxy group; one of X$_1$ and X$_2$ represents a hydrogen atom, and the other represents a 6-membered aromatic ring which may have a substituent, or an alkoxycarbonyl group (carbon atoms of an alkyl group is 1 to 3), or X$_1$ and X$_2$ bond each other and represent a group represented by —S-o.phe-CO—;

In addition, one of X$_3$ and X$_4$ represents a hydrogen atom or an alkoxycarbonyl group (carbon atoms of an alkoxy group is 1 to 4), and the other represents a group represented by —B—Y— or a lower alkoxycarbonyl group (carbon atoms of an alkoxy group is 1 to 4), or X$_3$ and X$_4$ bond each other and represent group represented by —CH=N—N(lower alkyl)-CO— (carbon atoms an alkyl group is 1 to 3);

In addition B represents a benzene ring or a naphthalene ring, which may have a substituent; Y represents a hydrogen atom, a fluorine atom, a chlorine atom, a nitro group, a cyano group, an alkyl group having carbon atoms of 1 to 3, an alkoxy group (carbon atoms of alkyl group is 1 to 10), an alkyloxycarbonylvinyl group (carbon atoms of alkyl group is 1 to 4), a dialkylamino group (carbon atoms of alkyl group is 1 to 3), a dihydroxyethylamino group, a hydroxyalkylamino group (carbon atoms of alkyl group is 1 to 3), a dicyanoethylamino group, or a cyanoethylalkylamino group (carbon atoms of alkyl group is 1 to 3).

In addition, a subscript "p" represents an integer of 1 to 10; "phe" represents a benzene ring; and "p.phe" or "o. phe" represents that two substituents are in p-position or o-position, respectively.)

A polyimide compound having, partial structure presented by the following formula (2):

(Chemical Formula 2)

(2)

[wherein R$_1$ represents a residue group of an alicyclic or an aromatic ring type tetracarboxylic acid; n' represents an integer of 2 to 10000; R$_2$ represents a group having a photoactive group represented by the following formula (f) or formula (g):

(Chemical Formula 3)

(f)

(wherein Z$_1$ represents a group represented by Y-p.phe-N=N—B$_0$—, Y-p.phe-N=CH—B$_0$—, or Y-p.phe-CH=N—B$_0$—; B$_0$ represents B or —C$_6$H$_4$O(CH$_2$)$_p$CO—, and each symbol of "p.phenyl", B and a subscript p represents the same meaning as the above; and q represents an integer of 2 to 4)

(Chemical Formula 4)

(g)

(wherein Z$_1$ represents the same meaning as the above; r represents an integer of 1 to 5; and s represents an integer of 2 to 8)].

A polyurethane compound having partial structure represented by the following chemical formula (3):

(Chemical Formula 5)

(3)

(wherein R$_2$ represents the same meaning as one in the above formula (2); R$_3$ represents —(CH$_2$)$_m$— and m represents 2 to 8; and n represents an integer of 5 to 10000)

A polyester compound having partial structure represented by the following chemical formula (4):

(Chemical Formula 6)

(4)

(wherein $Z_2$ represents a group represented by (a) —N=N-A-X or (e) —OCO(CH$_2$)$_p$O-p.phe-N=N—B—Y and each symbol of A, X, p, p. phe, B and Y represent the same meaning as those in the above formula (1); $R_4$ represents a benzene ring, a naphthalene ring or a methylene group having carbon atoms of 4 to 6 (such as a tetramethylene group and a hexamethylene group); n represents an integer of 5 to 10000.)

As preferable ones in the above, the following compounds are included:

(1) a polyamide compound having partial structure in the general formula (1), wherein z is the above (a) —N=N-A-X or the above (e) —OCO(CH$_2$)$_p$O-p.phe-N=N—B—Y.

(2) a polyimide compound or a polyurethane compound having partial structure in the general formulae (2) and (3), wherein $z_1$ in the above formula (f) or (g) is Y-p.phe-N=N-A-.

(3) a polyester compound having partial structure of the general formula (4).

(4) a homopolymer or a copolymer of liquid crystalline polyvinyl cinnamate.

Among these, a liquid crystalline polycondensation type polymer and a liquid crystalline polyaddition reaction type polymer in the above (1) to (3) can be obtained by a reaction of one bifunctional monomer having photoactive groups, and the other bifunctional monomer in equimolar ratio, as a desired liquid crystalline polymer compound (homopolymer).

In producing a copolymer, by using one bifunctional monomer having photoactive groups and, for example, the same kind of bifunctional monomer not having photoactive groups in combination, and by a reaction with the other bifunctional monomer in equimolar ratio, similarly as in the above, a desired copolymer can be obtained, and as the result, a liquid crystalline polymer compound can be obtained.

By changing use ratio of a monomer having photoactive groups, and the same kind of monomer not having photoactive groups, bonding amount of photoactive groups in a polymer compound can be adjusted. As the other bifunctional monomer which can be reacted with a bifunctional monomer having photoactive groups, for example, 4,4'-diamino-3,5,3', 5'-tetra-R-substituted-diphenylmethane (wherein R represents the same meaning as in the above general formula (1)), an alicyclic or an aromatic ring type tetracarboxylic acid, an aliphatic dicarboxylic acid having carbon atoms of 2 to 8, and the like are included.

As an alicyclic or an aromatic tetracarboxylic acid, an alicyclic or an aromatic tetracarboxylic acid having carbon atoms of 4 to 6; a condensed ring type tetracarboxylic acid with 4 carboxyl groups on a condensed ring having carbon atoms of 8 to 10; or tetracarboxylic acid obtained by bonding 2 alicyclic or aromatic rings, having carbon atoms of 4 to 6, both having 2 carboxyl groups, or 2 condensed rings having 2 carboxyl groups on a condensed ring having carbon atoms of 8 to 10, through or not through a crosslinking group; and the like are included. A crosslinking group adoptable is not especially limited, and lower alkylene group, CO group, nitrogen atom, oxygen atom, and the like are included.

In addition, a homopolymer of liquid crystalline polyvinyl cinnamate is obtained by polymerization of a vinyl cinnamate monomer. In the case of obtaining a copolymer, by copolymerization of a vinyl cinnamate monomer with a monomer copolymerizable therewith but not inhibiting liquid crystalline property and not having photoactive groups, a liquid crystalline polymer compound consisting of a desired copolymer can be obtained. By varying use ratio of vinyl cinnamate monomer to the monomer not having photoactive groups, bond amount of photoactive groups in a polymer compound can be adjusted. A specific example of a monomer copolymerizable with a vinyl cinnamate monomer but not having photoactive groups to obtain a copolymer includes, for example, (4-(4'-n-pentyl)-phenyl-styrene, 4-(4'-n-hexyl)phenyl-styrene, 4-(4'-n-pentyl)cyclohexylstyrene, 4-(4'-n-hexyl)-cyclohexylstyrene, and the like.

Use ratio of the bifunctional monomer having photoactive groups to the monomer not having photoactive groups, to be reacted with said bifunctional monomer having photoactive groups, so as to obtain a copolymer, depends also on structure of the monomer, however, is in a range of 1:0 to 1:100, more preferably 1:0 to 1:50, in molar ratio.

A polymerization reaction may be carried out by a solution polymerization method, and the like, in a usual solvent, according to a conventionally well-known method to obtain a conventionally well-known polyamide compound, a polyimide compound, a polyurethane compound, or a polyester compound, a polyvinyl cinnamate polymer.

Polymerization degree and the like of the resultant liquid crystalline polymer having photoactive groups used in the present invention, is not especially limited, and depends on kinds of a resin and a photoactive group and the like, and not simply be described, however, it is usually not lower than 2, preferably not lower than 5, and further preferably from about not lower than 10 to 10000.

As the bifunctional monomer having photoactive groups, for example, o-phthalic acid having photoactive groups on the benzene nucleus; di[aminoalkyl (carbon atoms of alkyl group is 2 to 4), or aminoalkyl (carbon atoms of alkyl group is 2 to 8) aminocarbonylalkyl (carbon atoms of alkyl group is 1 to 5)]amine, wherein a nitrogen atom substituted with 2 alkyl groups is further substituted with photoactive groups; and the like are included.

Specific examples of the bifunctional monomer having photoactive groups, as raw material of a crystalline polymer used in the present invention, are shown below, however, they are only for exemplifications and not limited thereto.

(1) Examples of monomers having a group with a non-aromatic N=N bond as a photoactive group, include the following: Monomers suitable to prepare a polyamide compound or a polyester compound:

As preferable ones among these, isophthalic acid having the above (a) or (e), as a substituent z having a photoactive group, is included.

Examples of preferable compounds are shown below:

(Chemical formula 7)

(Chemical formula 8)

-continued

(Chemical formula 9)

Monomers suitable to prepare a polyimide compound or a polyurethane compound:

(Chemical formula 10)

(Chemical formula 11)

(2) Examples of monomers having a group with a non-aromatic C=N bond as a photoactive group, include the following: Monomers suitable to prepare a polyamide compound or a polyester compound:

(Chemical formula 12)

Monomers suitable to prepare a polyimide compound or a polyurethane compound:

(Chemical formula 13)

(3) Examples of monomers having a group with a non-aromatic C=C bond as a photoactive group, include the following: Monomers suitable to prepare a polyamide compound or a polyester compound:

(Chemical formula 14)

Monomers suitable to prepare a polyimide compound or a polyurethane compound:

(Chemical formula 15)

-continued

In the present invention, as examples of a non-crystalline polymer, polymethacryloyl(acryloyl)-oxymethoxycarbonyloxyethylazobenzenes are included, and as the specific example, polymethacryloyl(acryloyl)-oxymethoxycarbonyloxyethylazobenzene is included.

As a method for forming a liquid crystalline or non liquid crystalline polymer thin film having such photoactive groups on a substrate, various methods can be adopted. A spin-coating method can be used for the present invention. A liquid crystalline or non liquid crystalline polymer thin film may be formed on a substrate by the Langmuir-Blodgett method, or may be adsorbed by immersing a substrate into a solution of a liquid crystalline or non liquid crystalline polymer compound. A spin-coating method is a preferable method.

Film thickness is preferably not higher than about 5 μm usually, more preferably not higher than 3 μm, and even the thickness not higher than 1 μm can provide satisfactory result. In forming these coating films, usually a solution of a liquid crystalline or non liquid crystalline polymer compound obtained by dissolving said liquid crystalline or non liquid crystalline polymer is used. Concentration of said polymer in a solution cannot simply be described, because suitable concentration depends on kind of said polymer, degree of polymerization, coating method, desired film thickness, and the like, however, it is usually from about 0.1% by weight to 10% by weight, preferably from about 0.5% by weight to 5% by weight.

Suitable concentration can easily be determined by carrying out a preliminary test responsive to a coating method to be adopted. A solvent to be used is not especially limited as long as it can dissolve said polymer compound, and a specific example of a solvent to be used includes an aprotic polar solvent such as pyridine, dimethylformamide (DMF), dimethylsulfoxide (DMSO), N-methylpyrrolidinone (NMP), dimethylacetamide (DMAC), and dimethylimidazoline (DMI).

In the present invention, as a substrate, transparent organic or inorganic material can be used. A specific example of a substrate to be used includes a glass plate, a polyester film, a triacetate film, a polyether sulfone film, and the like. As thickness of a substrate, one in an arbitrary range suitable to a substrate for a display can be used.

As a method for irradiation of linear polarized light onto a thin film of a liquid crystalline or non liquid crystalline polymer compound having photoactive groups, formed on a substrate, various well-known methods for irradiation can be applied.

To produce a micropattern retardation element of the present invention, a pattern is required to be imprinted to a liquid crystalline or non liquid crystalline polymer thin film having photoactive groups, and it is attained by irradiation of linear polarized light onto said thin film through a desired mask pattern. Alternatively, it can be carried out by focusing laser light having polarized light property using a lens and the like, and by operating so that irradiation trajectory of laser light becomes a pattern form.

Exposure energy is preferably in a range of 1 mJ/cm$^2$ to 10 mJ/cm$^2$.

Variation of molecular axis orientation induced by irradiation of linear polarized light onto said thin film is reversible, and the pattern is freely overwritable by irradiation of linear polarized light with a different polarizing axis for each mask pattern.

Only by adsorption of birefringence molecules in a micropattern form, onto the resultant liquid crystalline or non liquid crystalline polymer thin film having photoactive groups, with a molecular axis oriented unidirectionally, namely, only by forming a birefringence layer onto said thin film, in a micropattern form, a molecular axis of the birefringence layer is oriented in an orientation direction of a molecular axis of photoactive groups, namely in a direction specified by a polarizing axis of linear polarized light irradiated onto said thin film, and fixing as it is, property as a micropattern retardation element is fulfilled.

A method for forming a birefringence layer onto said thin film, in a micropattern form is not especially limited, and a birefringence layer may be formed onto said thin film so that a molecular axis of birefringence molecules (for example, liquid crystal suitable to a retardation element, for example, colorless liquid crystal) is controlled by orientation of photoactive groups oriented in said thin film and by controlling unidirectionally.

This phenomena is explained in more specifically as follows: By application of a solution of birefringence molecules, for example, nematic liquid crystalline molecules having thermotropic property, or lyotropic property, onto a substrate having a liquid crystalline or non liquid crystalline polymer thin film having photoactive groups, with a molecular axis oriented unidirectionally, or by sandwiching birefringence molecules preferably with said two substrates, so that said thin film side of the substrate is present inside and, if necessary, by sealing the peripheral part, birefringence molecules orient unidirectionally by the effect of photoactive groups with the molecular axis oriented unidirectionally in said thin film, and said birefringence layer can be formed in micropattern form.

In application of a solution of said birefringence molecules onto a substrate having said polymer thin film, a solution of nematic liquid crystalline molecules having lyotropic liquid crystalline property is preferable, and as said solution, a solution of a cromonic compound such as cromoglycate (for example, about 1 to 20, preferably 2 to 10% by mass) is preferable.

In preparation of a retardation element by sandwiching the above birefringence molecules, for example, liquid crystal, by two substrates (at least one of the substrates is one having said polymer thin film), sandwiching in nematic liquid crystalline state of any of thermotropic liquid crystal or lyotropic liquid crystal. Usually, a vacant liquid crystal cell having said polymer thin film is prepared at the inner side, and liquid in said nematic liquid crystalline state is preferably encapsulated therein.

In this case, a molecular axis of said birefringence layer orients in a direction specified by a polarizing axis of linear polarized light irradiated onto a liquid crystalline or non liquid crystalline polymer thin film having photoactive groups, and makes it possible to fulfill characteristics as a micropattern retardation element.

In this connection, a liquid crystalline polymer means a polymer showing liquid crystalline property under certain constant conditions. A polymer showing so called lyotropic liquid crystalline property in the presence of a solvent, and a thermotropic liquid crystal polymer showing liquid crystal structure in molten state without presence of a solvent are well-known. Generally, a liquid crystalline polymer has a layer wherein molecular chains are highly oriented in a flow direction in liquid crystalline state, and by fixing such oriented state, high strength and highly elastic material is obtained.

In Patent Document 5 and Patent Document 6, cited as conventional examples, a method for displaying three-dimensional image by combination of an element whose phase is 180 degree partially different, and a liquid crystal display has been disclosed.

In the present invention, by combination of a micropattern retardation element produced as described above, and a liquid crystal display, so that phase thereof is different by 180 degree, recognition of three-dimensional image display as three-dimensional image becomes possible.

As thermotropic type nematic liquid crystal used in the present invention, E-8 liquid crystal, ZLI-1565, ZLI-2140, ZLI-2582, ZLI-2788, ZLI-3462-000, ZLI-1844, MLC-9000-000/100, MLC-9100-000/100 (all produced from Merck Co., Ltd.), LIXON5005, LIXON5011, LIXON5013, LIXON5016, LIXON6520, LIXON9160, LIXON9839 (all produced from Chisso Corp.) are suitably used, however, other types may also be used. Biphenyl-based thermotropic type nematic liquid crystal, for example, E-8 liquid crystal above is one of the preferable ones.

In addition, as a compound forming lyotropic liquid crystal, an amphipathic low molecular weight compound having an anionic, cationic or nonionic charge, a polymer compound such as a cellulose derivative or polysiloxane, or a cromonic compound such as cromoglycate are included. As a solvent to dissolve these lyotropic liquid crystal, water; alcohols; ethers; aprotic polar solvents such as pyridine, dimethylformamide (DMF), dimethylsulfoxide (DMSO), N-methylpyrrolidinone (NMP), dimethylacetamide (DMAC), and dimethylimidazoline (DMI); are preferable. In particular, a mixed solvent mainly composed of water is preferable. Mixing amount of an organic solvent in this case is arbitrary, however, usually, 0 to 70% by mass, in particular, 0 to 50% by mass is preferable.

In the case of sealing a solution of lyotropic liquid crystal by sandwiching with substrates, filling may be carried out as a solution in concentration showing nematic liquid crystalline state of said liquid crystalline compound, and in the case of application onto the above polymer thin film, there is no problem as long as such concentration is adopted that makes it possible to form nematic liquid crystalline state during drying. Concentration of a liquid crystalline compound in these solutions cannot easily be described, however, it is 1 to 60% by mass and preferably about 2 to 50% by mass.

The present invention is specifically explained below by means of Examples; however, the present invention is not limited to these Examples. In these Examples, "parts" represents "parts by mass", and "%" represents "% by mass", unless otherwise specified.

Example 1

Figure 1:
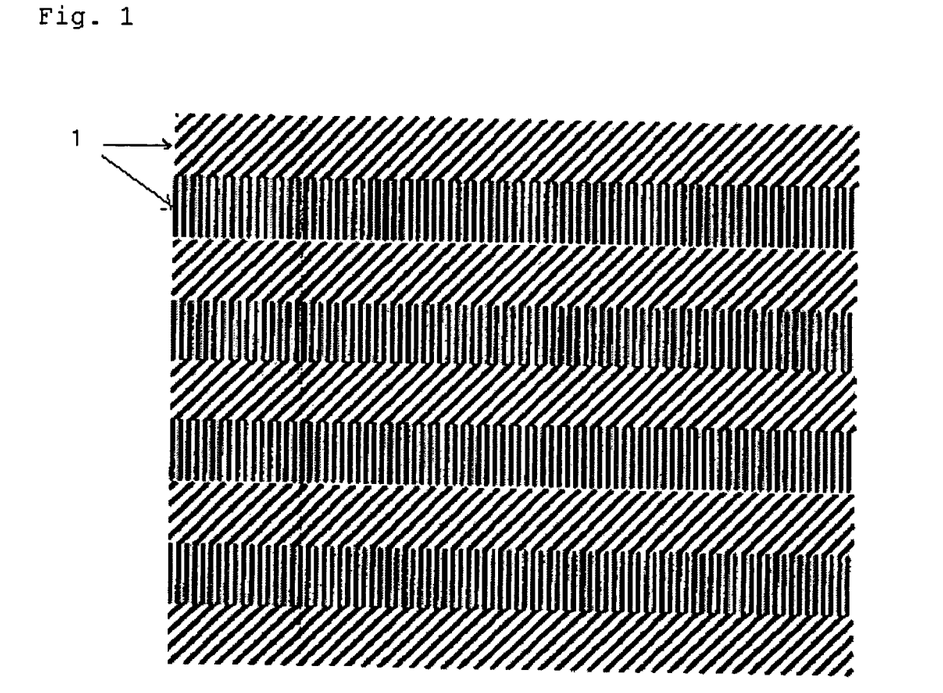
FIG. 1 is a schematic view showing partially oriented state by irradiation of linear polarized light according to Example 1.

Preparation of a Thin Film of a Polyamide Containing Photoactive Groups and Irradiation of Linear Polarized Light Into 98 parts of NMP, 2 parts of a purified product of poly{imino-5-[4'-(4"-dimethylaminophenylazo)phenoxy-undecanoyloxy]isophthanoylimino-1,4-(3,5-diethyl)-phenylenemethylene-1,4-(3,5-diethylphenylene)} (a polyamide compound) was dissolved to prepare a 2% polymer solution. Then, spin coating is carried out so that a dry film thickness of from 0.6 to 0.7 μm can be obtained on a glass substrate, and it was subjected to drying by heating at 180° C. for 10 minutes to form said polyamide thin film. At the peripheral of the resultant 2 glass substrates, an epoxy resin mixed with spherical silica spacers having a diameter of about 7 μm was coated, except for a charging port for liquid crystal, and the glass substrates were pasted so that the inner sides of photo-orientation films are opposing. Whole film surface of the glass substrate formed with said polyamide thin film, was irradiated by linear polarized light, obtained by passing visible light from a high pressure mercury lamp (500 W/hr) and produced by using a cut-off filter at 400 nm, through a polarizing plate, for 1 minute from a distance of 50 cm from said polyamide thin film, to unidirectionally orient a molecular axis of photoactive groups. Then, the whole surface of the glass substrate was covered with a photo mask having stripes in about 70 μm interval, so that the stripe direction is in parallel to electric vector of linear polarized light used in the first irradiation, and over which linear polarized light rotated by 45 degree from the first linear polarized light was irradiated to prepare a vacant liquid crystal cell. FIG. 1 schematically shows partially oriented state of photoactive groups induced by irradiation of linear polarized light, wherein reference numeral 1 represents micropattern alignment of axises of the photoactive groups of the polymer.

Figure 2:
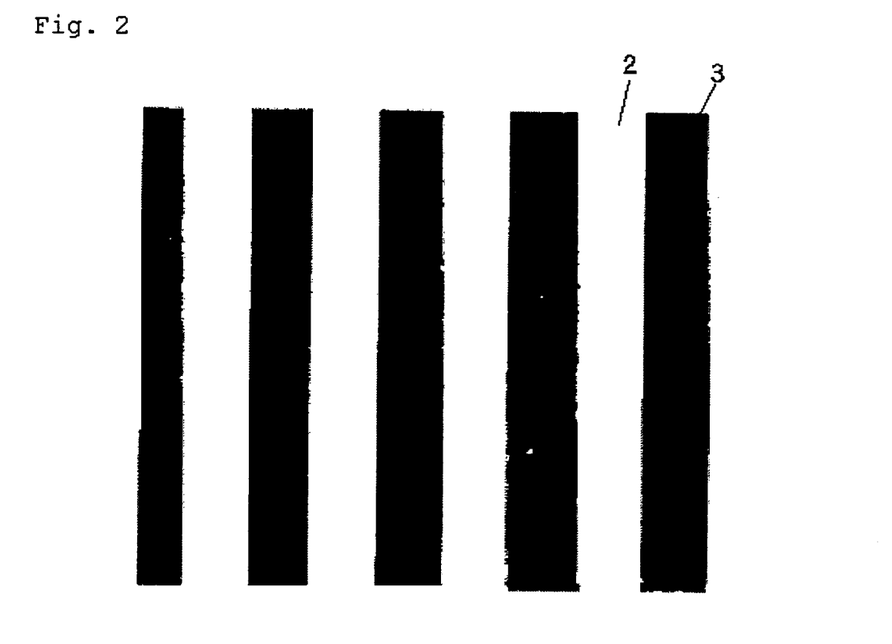
FIG. 2 shows polarized light microscope image of a birefringence layer oriented by light according to Example 1.

After light irradiation, thermotropic-type nematic liquid crystal E-8 liquid crystal (product name: produced from Merck Co., Ltd.) was charged into the space of the vacant liquid crystal cell (the space of two glass substrates), and the peripheral of the liquid crystal cell was completely sealed with an epoxy resin to obtain a retardation element of the present invention. This element was observed with a polarized light microscope and confirmed orientation controlled state of E-8 liquid crystal. FIG. 2 shows the photo image with the polarized light microscope, wherein reference numeral 2 represents the white field of view in a polarized light microscope, and the white field of view means that the face of the linear polarized light was changed by passing through the region of the birefringence layer corresponding to the region of diagonal lines in the horizontal pattern having stripes of FIG. 1. Reference numeral 3 in FIG. 2 represents the black field of view in a polarized light microscope, and the black field of view means that the face of linear polarized light was not changed by passing through the region of the birefringence layer corresponding to the region of vertical lines of FIG. 1.

Example 2

Figure 3:
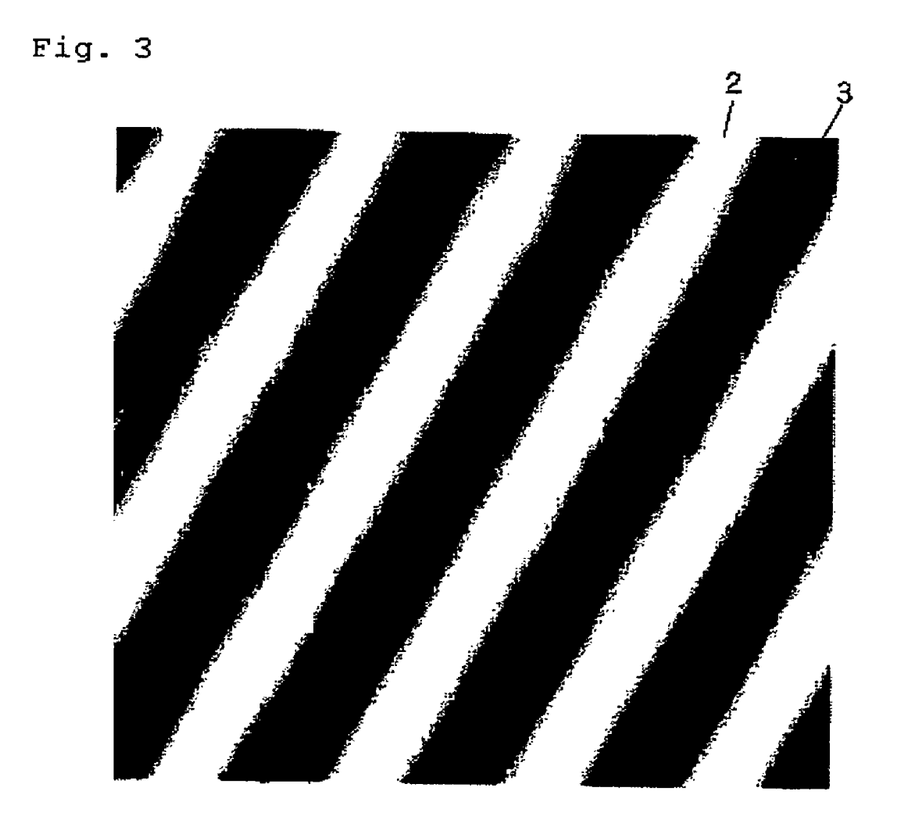
FIG. 3 shows polarized light microscope image of a birefringence layer oriented by light according to Example 2.

Similarly as in Example 1, except that direction of a photo mask having stripes was changed, a light irradiated vacant liquid crystal cell was prepared, and into the space of said liquid crystal cell, an about 32% aqueous solution of lithium 4-trans-pentyl cyclohexanoate was charged at about 45° C., and the peripheral of the liquid crystal cell was completely sealed with an epoxy resin. Temperature of the liquid crystal cell was lowered to room temperature (25° C.) and the cell was observed with the polarized light microscope to confirm orientation controlled state. FIG. 3 shows a photo image with the polarized light microscope, wherein reference numeral 2 represents the white field of view when the horizontal pattern having stripes of FIG. 1 was changed to a diagonal pattern having stripes, and reference numeral 3 represents the black field of view when the horizontal pattern having stripes of FIG. 1 was changed to a diagonal pattern having stripes.

Lithium 4-trans-pentyl cyclohexanoate, showing lyotropic liquid crystalline property, was synthesized from 4-trans-pentyl cyclohexanoic acid and lithium hydroxide as follows:

19.8 g of 4-trans-pentyl cyclohexanoic acid was dissolved into 100 mL of a 5% aqueous solution of lithium hydroxide by heating under stirring. After complete dissolving, the solution was subjected to concentration under reduced pressure, using a rotary evaporator. Into an aqueous solution containing crystal deposited by sufficient concentration, 100 mL of ethanol was added, filtered and then washed with ethanol. The resultant white crystal was purified by recrsytallization from hydroethanol.

Needle-like crystal: melting point of 236 to 238° C.; IR spectrum (KBr): 2913, 2850, 1550, 1445 cm$^{-1}$; elemental analysis: $C_{12}H_{21}O_2Li$ (%); theoretical value C, 70.55; H, 10.38, measured value C, 70.16; H, 10.22.

Critical micelle concentration of an aqueous solution of lithium 4-trans-pentyl cyclohexanoate was $1.676 \times 10^{-2}$ mol/L, showing a nematic phase in about 32%, and a hexagonal phase in about 37% at room temperature (25° C.).

Example 3

A light orientation film was produced using poly(1-(2-methacryloyloxymethoxy)-4'-carbonyloxyethylazobenzene), and a liquid crystal cell was produced similarly as in Example 1, and into the space of 2 glass substrates of the light irradiated liquid crystal cell, an about 32% aqueous solution of lithium 4-trans-pentyl cyclohexanoate was charged, and by light orientation of a lyotropic liquid crystalline phase of lithium 4-trans-pentyl cyclohexanoate, good orientation state was obtained.

Example 4

According to Example 1, a glass substrate having a polyamide thin film containing photoactive groups was formed, and said glass substrate was irradiated by linear polarized light, obtained by passing visible light produced by using a cut-off filter at 400 nm, through a polarizing plate, using a high pressure mercury lamp for 1 minute from a distance of 50 cm from said substrate, to unidirectionally orient a molecular axis of photoactive groups. Then, the whole surface of the glass substrate was covered with a photo mask having stripes in about 70 μm interval, so that the stripe direction is in parallel to electric vector of linear polarized light used in the first irradiation, and over which linear polarized light rotated by 45 degree from the first linear polarized light was irradiated to prepare an exposed substrate.

Then, a solution dissolved with 5 parts of sodium cromoglycate (produced from Shiono Chemical Co., Ltd.), 0.2 parts of Emal 20C (product name: produced from Kao Corp.) into 94.8 parts of deionized water, was prepared. This solution was applied onto the above exposed substrate, and dried under a condition of 25° C. and 60% RH, to obtain a retardation element having a stripe form, of the present invention.

INDUSTRIAL APPLICABILITY

A liquid crystal display using a retardation element of the present invention, which makes it possible to partially control in-plane orientation of nematic liquid crystal, makes it possible to control in-plane orientation of liquid crystal in micrometer extremely small region in an arbitrary direction, and therefore, application to high quality LCD such as low power consumption drive, high definition display, display of highly realistic presence feeling, and the like is possible, and practical application is prospective to such as potable display medium essentially requiring low power consumption drive, high quality TV with high contrast and high definition, three-dimensional liquid crystal TV providing realistic presence feeling, and the like.

The invention claimed is:

1. A retardation element comprising a substrate, a thin film layer of a non liquid crystalline polymer having photoactive groups wherein the thin film is formed on the substrate and the axis of the photoactive groups is oriented in a micropattern form by photo orientation treatment, and a birefringence layer formed so as to contact with said thin film layer, wherein an axis of birefringence molecules of said birefringence layer is oriented in a micropattern form which is controlled by orientation of the axis of said photoactive groups, and wherein the non liquid crystalline polymer thin film layer is a thin film layer consisting of polymethacryloyl(acryloyl)oxymethoxycarbonyloxyethyl-azobenzene.

2. The retardation element according to claim 1, wherein the photoactive group is at least one group selected from a group consisting of non-aromatic N=N, non-aromatic C=C and non-aromatic C=N.

* * * * *